United States Patent
Romo et al.

(10) Patent No.: US 12,536,086 B2
(45) Date of Patent: Jan. 27, 2026

(54) SYSTEM, METHOD AND APPARATUS FOR HIGH LEVEL MICROARCHITECTURE EVENT PERFORMANCE MONITORING USING FIXED COUNTERS

(71) Applicant: Intel Corporation, Santa Clara, CA (US)

(72) Inventors: Claudia Romo, Manchaca, TX (US); Jonathan Combs, Austin, TX (US); Beeman Strong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 891 days.

(21) Appl. No.: 17/556,751

(22) Filed: Dec. 20, 2021

(65) Prior Publication Data
US 2023/0195593 A1 Jun. 22, 2023

(51) Int. Cl.
*G06F 9/30* (2018.01)
*G06F 11/30* (2006.01)
*G06F 11/34* (2006.01)

(52) U.S. Cl.
CPC ...... *G06F 11/3466* (2013.01); *G06F 9/30101* (2013.01); *G06F 11/3072* (2013.01); *G06F 11/3409* (2013.01)

(58) Field of Classification Search
None
See application file for complete search history.

(56) References Cited

U.S. PATENT DOCUMENTS

2018/0189160 A1 7/2018 Yasin
2022/0147455 A1* 5/2022 Branover ............ G06F 13/1668

OTHER PUBLICATIONS

Intel Corporation, Intel® 64 and IA-32 Architectures Software Developer's Manual, Order No. 325462-073US, Nov. 2020, vol. 3B, Chapter 18, pp. 1-149.
Ahmad Yasin, A Top-Down Method for Performance Analysis and Counters Architecture, IEEE International Symposium on Performance Analysis of Systems and Software, Mar. 23-25, 2014, Monterey, CA, pp. 1-19.
European Patent Office, Extended European Search Report dated May 9, 2023 in European Patent Application No. 22208653.0 (10 pages).
"Intel Architecture Instructions Set Extensions and Future Features Programming Reference," Intel Corporation, May 2021 (214 pages).

* cited by examiner

*Primary Examiner* — Scott C Sun
(74) *Attorney, Agent, or Firm* — Nicholson De Vos Webster & Elliott LLP

(57) ABSTRACT

In one embodiment, an apparatus includes: at least one core to execute instructions; and a plurality of fixed counters coupled to the at least one core, the plurality of fixed counters to count events during execution on the at least one core, at least some of the plurality of fixed counters to count event information of a highest level of a hierarchical performance monitoring organization. Other embodiments are described and claimed.

20 Claims, 8 Drawing Sheets

SYSTEM, METHOD AND APPARATUS FOR HIGH LEVEL MICROARCHITECTURE EVENT PERFORMANCE MONITORING USING FIXED COUNTERS

BACKGROUND

Modern processors typically include performance monitoring capabilities to enable skilled users to perform debug and code analysis functions. In some processors, a top-down microarchitecture analysis (TMA) methodology is provided for use in identifying software performance issues. This TMA methodology is a hierarchical organization of event-based metrics that identifies dominant performance bottlenecks in an application. Its aim is to show, on average, how well processor pipeline(s) are utilized while running an application. However, current mechanisms for accessing this information can suffer from lack of precision and/or resource impacts.

DETAILED DESCRIPTION

Figure 1:
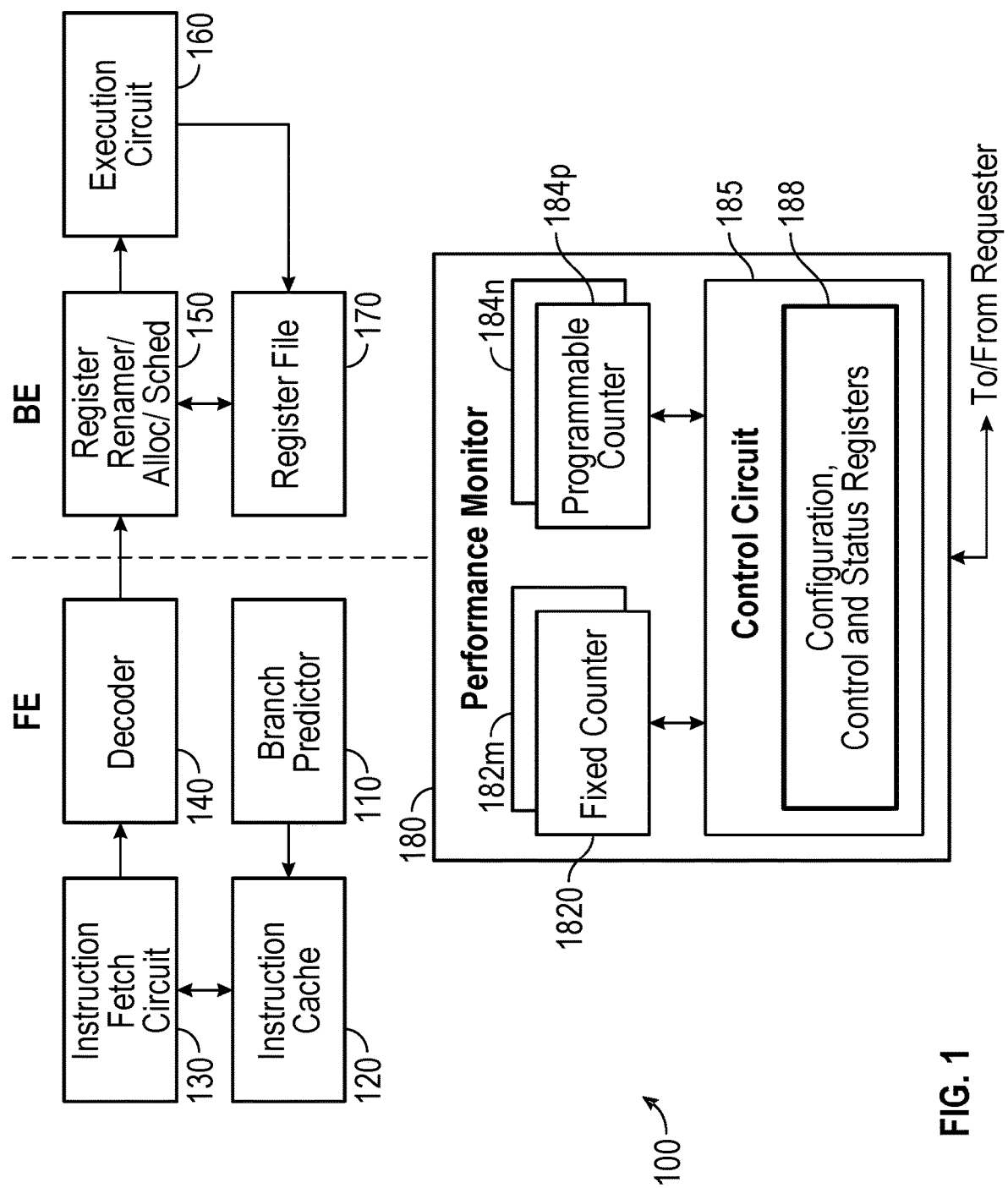
FIG. 1 is block diagram of a processor in accordance with an embodiment.

In various embodiments, a processor may be configured with multiple dedicated or fixed counters of a performance monitoring unit to enable counting of raw events of a highest hierarchical level of a multi-level performance monitoring methodology (also referred to herein equally as a "performance monitoring arrangement," "performance monitoring organization," and "performance monitoring system"). Although embodiments are applicable to any performance monitoring arrangement, a particular implementation described herein is for an Intel® Top-Down Microarchitecture Analysis (TMA) methodology. In this methodology, there can be multiple levels of performance metrics that may monitor from a highest level to a lowest level of a hierarchy. In different cases there may be 2, 3 or more levels of performance metrics.

In one or more examples, a set of fixed counters may be provided, each associated with a particular highest level performance metric, which according to the above TMA methodology is a TMA level 1 (L1). In this way, the need for allocating programmable counters for counting such metric information or obtaining the information through a performance metric model specific register (MSR) can be avoided.

Through these counters, a low-cost mechanism is realized to offload precious programmable counters. These fixed counters reduce multiplexing by allowing particular highest level events to be collected alongside programmable events (which may be programmed for lower level events). These fixed counters are very precise and fast to access, as they provide raw counts and have a size that may incur clearing on overflow at a relatively long duration, e.g., approximately 400 seconds.

In one processor implementation, it may be assumed that for each core, on each clock cycle, there are N (e.g., 4) pipeline slots available. Certain performance monitoring unit (PMU) events may be used to measure how well those pipeline slots were utilized. In this implementation, each pipeline slot available during an application's runtime can be classified into one of four L1 categories (Front End Bound, Bad Speculation, Back End Bound, Retiring) based on occurrence of these PMU events during execution. In other cases, more or different L1 metrics may be maintained. In some cases, one of these four L1 categories may not be maintained in a fixed counter, but this L1 performance metric can be derived from the other L1 performance metrics as described further below.

In contrast to embodiments that provide fixed counters for a highest hierarchical level of a performance monitoring arrangement, other means of capturing TMA data have drawbacks. Without an embodiment and with a limited number of programmable counters, a user would multiplex events across multiple runs of a workload to acquire a full profile and collect events at the lowest level of the hierarchy. TMA metrics can include dozens of events in total. This process of multiplexing can introduce problems in the profile, requiring more time to collect and at times generate inconsistent data, since each run of the workload may behave differently (e.g., based on what else is running on the system, interrupt rates, etc.). Embodiments may reduce or even avoid the need for multiplexing, thus improving fidelity of profiles.

Some processors may provide a performance metrics MSR (e.g., called PERF_METRICS MSR), which can provide a means to collect TMA L1 data without using programmable counters. However this counter can only provide percentage information, e.g., a percentage of slots that fell into each of the TMA L1 categories. But this PERF_METRICS interface has downsides. First, accesses to the PERF_METRICS MSR are much slower than accesses to PMU counters. While reads to programmable PMU counters can be as fast as 10 cycles (e.g., using a read operation via a read performance monitor counter instruction (RDPMC), a read of PERF_METRICS MSR takes around 100 cycles. On top of this time, there is additional latency to obtain percentage information, since the processor collects raw counts per L1 metric, then divides each by the total number of slots in order to compute the percentage to be returned for this MSR. Also, the precision of the L1 metrics degrades over time, as more slots are represented by each of the 8 bits that form the percentage for each L1 metric. To minimize the accumulation of this error, certain tools clear the PERF_METRICS MSR each time the value is consumed. This process can take ~500 cycles and may typically occur every millisecond, increasing the overhead of collecting the profile.

In an embodiment, processor identification information may be accessed to denote the presence of fixed performance monitoring counters, including the fixed counters described herein. In a particular example, software or another entity may discover the fixed counters described herein via a CPUID instruction:

CPUID.0xA.ECX[7:4]=0b1111 (Fixed counter bitmap).

In one or more examples, a set of four fixed counters may be provided to count the 4 TMA L1 metrics. Of course more or fewer such fixed counters may be provided in other examples to count additional or different TMA level 1 metrics. And in other examples, additional fixed counters may be provided for TMA metrics of other levels, and/or other types of metrics. In one embodiment, the following fixed counters may be allocated to the TMA L1 performance metrics:

IA32_FIXED_CTR4—TOPDOWN_BAD_SPECULATION (MSR 0x30D)
IA32_FIXED_CTR5—TOPDOWN_FE_BOUND (MSR 0x30E)
IA32_FIXED_CTR6—TOPDOWN_RETIRING (MSR 0x30F)
IA32_FIXED_CTR7—TOPDOWN_BE_BOUND (MSR 0x310)

Note that if any single counter is not supported, the missing metric can be computed from SLOTS−SUM (FixedCtr[7:4]), where SLOTS may be obtained from a another fixed counter or via another means. In an example processor there may be additional fixed counters that count additional events including retired instructions, unhalted core clocks, unhalted time stamp counter clocks, slots, among possibly others.

In one or more examples, these counters are enabled and configured in response to a request from a given performance analysis software or other entity. In response to such request, fields in one or more configuration registers may be set. This configuration register(s) may include various bit fields for configuring these fixed counters. As examples, the bit fields may enable the counters, their overflow behavior, user/operating system (OS) mode and so forth. In one or more examples, to enable a given fixed counter, an enable indicator of a global performance control register (e.g., PERF_GLOBAL_CTRL) may be set. In addition, an overflow indicator of a global performance status register (e.g., PER_GLOBAL_STATUS) may be set to indicate overflow behavior. Also, an in-use indicator of a global performance in-use register (e.g., PERF_GLOBAL_INUSE) may be set to indicate that the counter is active. Further, an enable indicator of a processor-event based sampling enable register (e.g., PEBS_ENABLE) may be set.

Further to configure the fixed counters, writes may be made to a fixed counter configuration register (e.g., FIXED_CTR_CTRL). In an embodiment, a configuration field may be provided in this register for each fixed counter. The configuration field may store information to identify whether the counter is enabled for a given privilege level (e.g., user or OS, or both), and whether a performance monitoring interrupt (PMI) is to be raised in response to overflow of the counter.

In some situations, a user may wish to determine the percentage of slots in each L1 category. To determine this percentage, the total number of slots can be collected by one of various means. In one example, a TOPDOWN.SLOTS event can be obtained via a fixed counter or a programmable event (as one example, this event may be: event ID 0xA4, umask 0x01). In an example for a fixed width microarchitecture, total slots may be computed by collecting total cycles and multiplying by the slots per cycle. Note that slots per cycle may vary per microarchitecture, but if the width is fixed, the width is enumerated in an ID register, e.g., CPUID.0xA.EDX[19:16] (otherwise 0, in which case the above technique may be used).

In yet another case, cycles can be collected via a fixed counter or a programmable CPU_CLK_UNHALTED.CORE event (as one example, this event may be: event ID 0x3c, umask 0x00).

Referring now to FIG. 1, shown is a block diagram of a portion of a processor in accordance with an embodiment. Note that in FIG. 1, processor 100 is shown at a high level, and illustrates a general pipeline architecture of a processing engine such as a processor core. Understand that multiple pipelines may be present in one or more cores. At the high level shown in FIG. 1, a performance monitor 180 also is present, details of which are described below.

In FIG. 1, a branch predictor 110 may, based upon history of branch direction, predict whether a branch is taken or not taken and provide this information to an instruction cache 120. Instruction cache 120 is coupled to an instruction fetch circuit 130. Instruction fetch circuit 130 may fetch instructions, either from instruction cache 120 or from another storage. In turn, fetched instructions, which at this point may be in the form of macro-instructions, are provided to a decoder 140. In embodiments, decoder 140 may decode each macro-instruction into one or more micro-operations.

Still with reference to FIG. 1, decoder 140 provides the decoded instructions to a register renamer 150 which, as shown, also may perform allocation and scheduling operations to schedule incoming instructions for execution within an execution circuit 160. Execution circuit 160 may include multiple execution units such as integer and floating point units to perform operations on incoming source operands. Results are provided via a write back path to a register file 170.

As further shown in FIG. 1, performance monitor 180 is coupled to both the front end and back end of processor 100. Understand that in one or more implementations performance monitor 180 may be a distributed hardware circuit that includes various storages, e.g., registers or other counters, to perform counting of various events or other operations, under control of a control circuit 185. As shown control circuit may include (or be coupled to) a set of registers 188, which may include configuration, control and status registers that may be used for enabling and configuring fixed counters described herein.

In the high level shown in FIG. 1, performance monitor 180 includes a set of fixed counters $182_{0-m}$ and a set of programmable counters $184_{n-p}$. With embodiments, at least some of fixed counters 182 may be provided for maintaining TMA level 1 counts as described herein. Although embodiments are not limited in this regard, in one or more examples there may be 8 fixed counters, including the 4 TMA level 1 counters and 4 additional counters that may count other events such as described above. In one or more embodiments a separate set of fixed and programmable counters may be provided per core. And while in FIG. 1 the various counters are generically shown in a performance monitor, in some implementations, the counters may reside in a bus cluster unit or other location.

In different examples, there may be different numbers of programmable counters. In one example, there may be 8 programmable counters. With embodiments, since there are fixed counters provided for TMA level 1 metrics, there is no need to allocate any of programmable counters 184 for these metrics, reducing pressure on these programmable counters. Understand while shown at this high level in the embodiment of FIG. 1, many variations and alternatives are possible.

Figure 2:
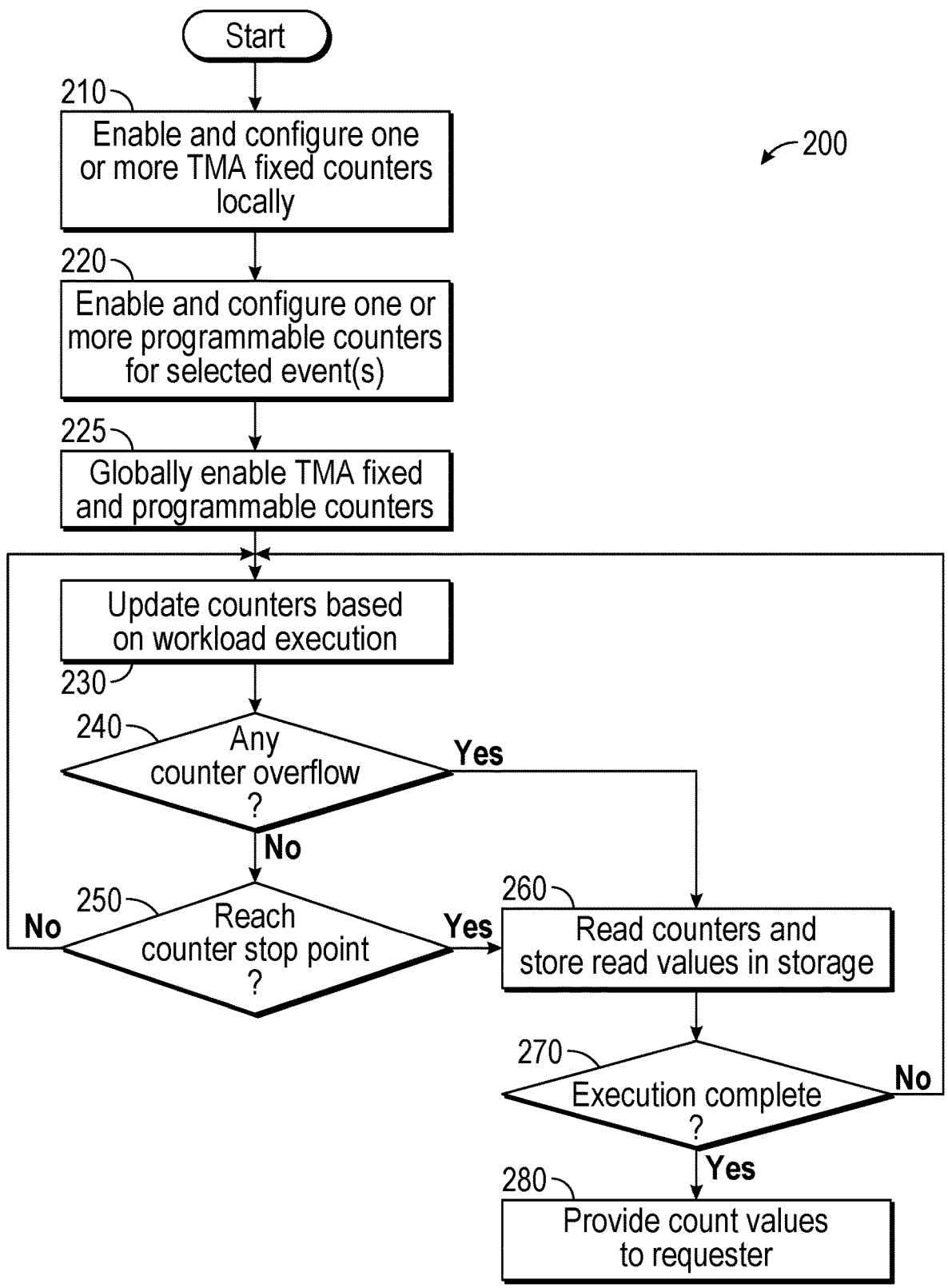
FIG. 2 is a flow diagram of a method in accordance with an embodiment.

Referring now to FIG. 2, shown is a flow diagram of a method in accordance with an embodiment. More specifically as shown in FIG. 2, method 200 is a method for controlling operation of one or more fixed and programmable counters of a performance monitor. In an embodiment, method 200 may be performed at least in part by hardware circuitry such as a control circuit 185 of the performance monitor. In other cases, method 200 may be performed by hardware circuitry, in combination with firmware and/or software.

As shown in FIG. 2, method 200 begins by enabling and configuring one or more TMA fixed counters (block 210). In an embodiment, these counters may be enabled in response to a write to one or more configuration registers. In this way, individual counters can be enabled and configured for a given mode of operation. For example, in one use case a performance monitoring tool may issue a request that causes the configuration register write.

Next at block 220 one or more programmable counters can be enabled and configured for a selected event or events. For example, additional configuration register writes may be performed to cause different ones of a set of programmable counters to be associated with given events. Then at block 225 both the fixed and programmable counters can be globally enabled.

At this point, the various counters of a performance monitoring unit are configured for normal operation. As such, a given application or other program of interest may begin execution. During such workload execution, at block 230 various counters may be updated based on this workload execution. For example, events that occur during processor execution and are associated with a particular top down level 1 metric may cause updating of an associated fixed counter.

During workload execution, it may be determined whether any counter overflows (diamond 240). If so, control passes to block 260 where at least this counter, and possibly all counters, may be read and their values stored in a storage such as a performance log file (which may be stored in a system memory, e.g., a dynamic random access memory (DRAM)).

Next control passes to diamond 270 to determine whether execution of the application (or a desired amount of application execution for performance monitoring) is complete. If not, control passes back to block 230. Otherwise when this execution has completed, control passes to block 280 where the count values may be provided to a requester. For example, a log file may be provided in a form readable by the user to identify various fixed and programmable counters and corresponding count values or other information present in each of the counters.

Still with reference to FIG. 2, if instead at diamond 240 it is not determined that any counter has overflowed, control may pass to block 250 where it can be determined whether a given counter has reached a stop point. For example, some counters may be programmed to count until a given value is reached. Upon such occurrence, control passes to block 260, discussed above. Understand while shown at this high level in the embodiment of FIG. 2, many variations and alternatives are possible. For example in other cases, one or more of the fixed counters can be read in response to a read performance monitor counter instruction (e.g., RDPMC), which can be executed in a small number of cycles (e.g., 10).

Figure 3A:
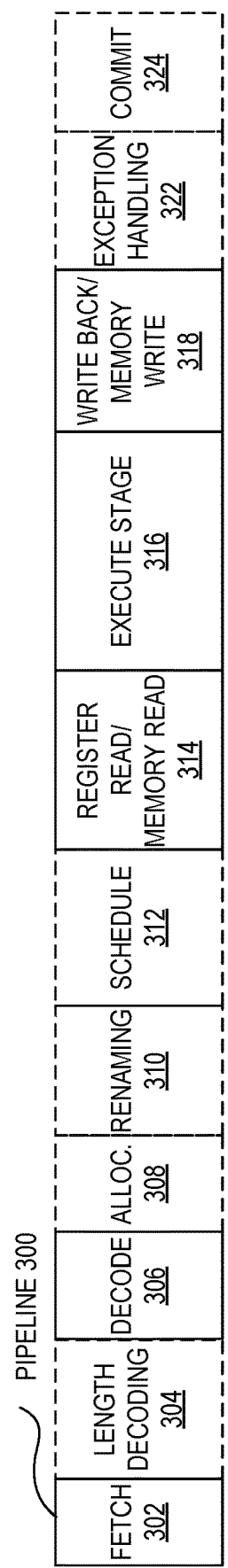
FIGS. 3A and 3B illustrate a block diagram of a more specific exemplary in-order core architecture.
Figure 3B:
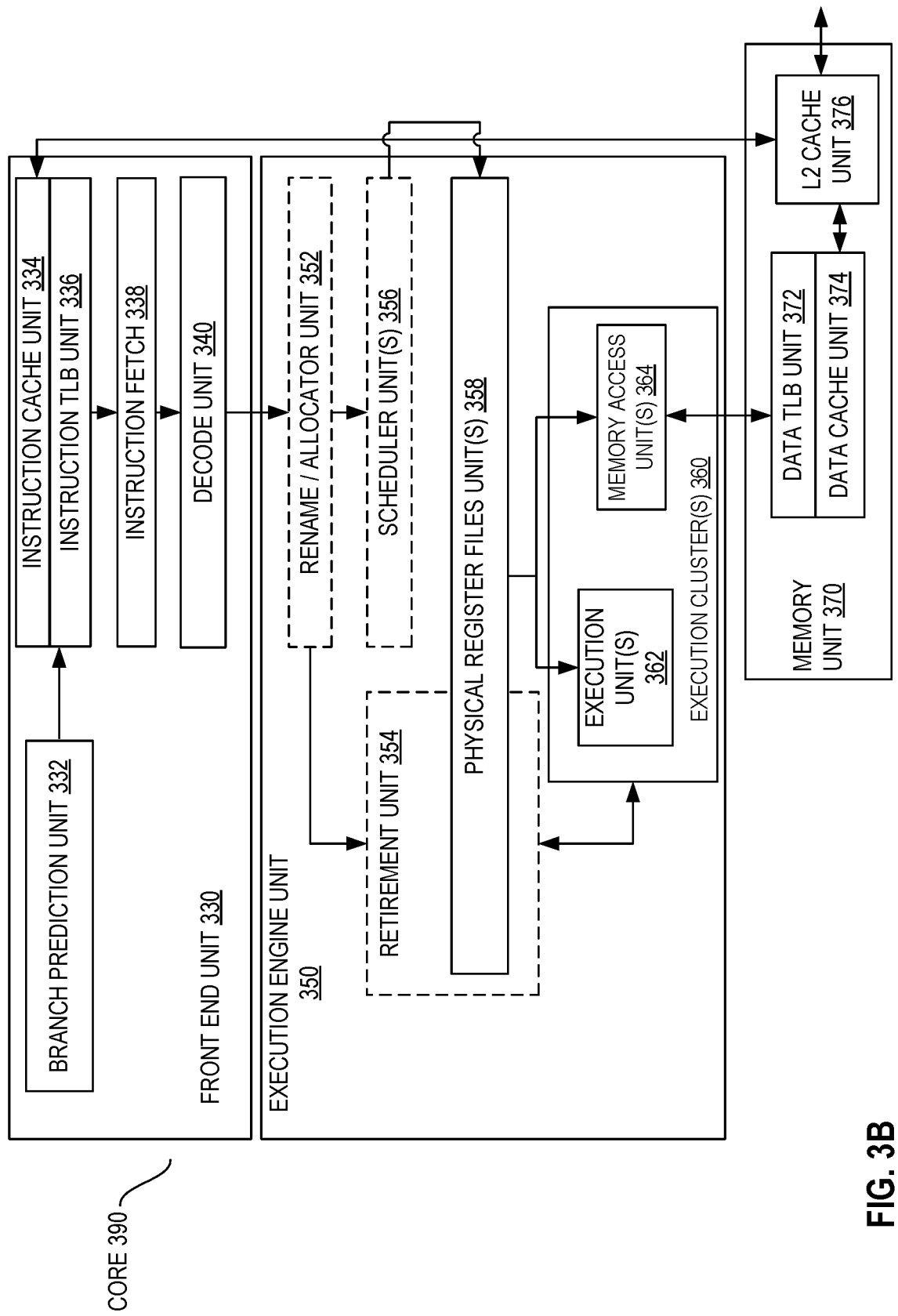

Embodiments may be implemented in many different processor types having different pipeline configurations. FIG. 3A is a block diagram illustrating both an exemplary in-order pipeline and an exemplary register renaming, out-of-order issue/execution pipeline according to embodiments of the invention. FIG. 3B is a block diagram illustrating both an exemplary embodiment of an in-order architecture core and an exemplary register renaming, out-of-order issue/execution architecture core to be included in a processor according to embodiments of the invention. The solid lined boxes in FIGS. 3A and 3B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3A, a processor pipeline 300 includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324. Note that as described herein, in a given embodiment a core may include multiple processing pipelines such as pipeline 300. And with embodiments microarchitectural events including TMA L1 events may be counted, at least in part, using fixed counters of a PMU, as described herein.

FIG. 3B shows processor core 390 including a front end unit 330 coupled to an execution engine unit 350, and both are coupled to a memory unit 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM or other medium that stores microcode for certain macroinstructions (e.g., in decode unit 340 or otherwise within the front end unit 330). The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations, central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 358 comprises a vector registers unit, a write mask registers unit, and a scalar registers unit. These register units may provide architectural vector registers, vector mask registers, and general purpose registers. The physical register file(s) unit(s) 358 is overlapped by the retirement unit 354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which includes a data TLB unit 372 coupled to a data cache unit 374 coupled to a level 2 (L2) cache unit 376. In one exemplary embodiment, the memory access units 364 may include a load unit, a store address unit, and a store data unit, each of which is coupled to the data TLB unit 372 in the memory unit 370. The instruction cache unit 334 is further coupled to a level 2 (L2) cache unit 376 in the memory unit 370. The L2 cache unit 376 is coupled to one or more other levels of cache and eventually to a main memory.

By way of example, the exemplary register renaming, out-of-order issue/execution core architecture may implement the pipeline 300 as follows: 1) the instruction fetch 338 performs the fetch and length decoding stages 302 and 304; 2) the decode unit 340 performs the decode stage 306; 3) the rename/allocator unit 352 performs the allocation stage 308 and renaming stage 310; 4) the scheduler unit(s) 356 performs the schedule stage 312; 5) the physical register file(s) unit(s) 358 and the memory unit 370 perform the register read/memory read stage 314; the execution cluster 360 perform the execute stage 316; 6) the memory unit 370 and the physical register file(s) unit(s) 358 perform the write back/memory write stage 318; 7) various units may be involved in the exception handling stage 322; and 8) the retirement unit 354 and the physical register file(s) unit(s) 358 perform the commit stage 324.

The core 390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 334/374 and a shared L2 cache unit 376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
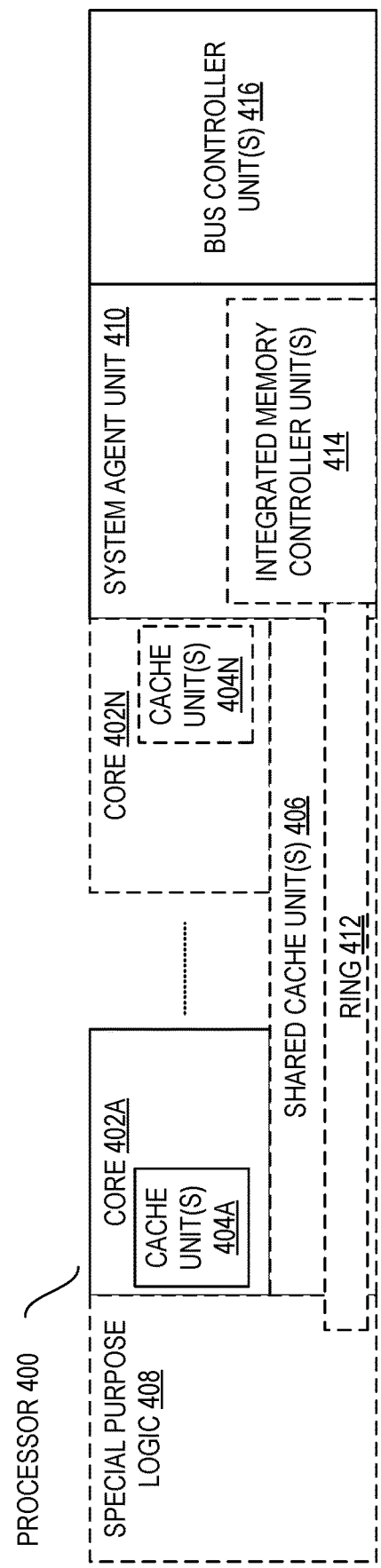
FIG. 4 is a block diagram of a processor according to embodiments of the invention.

FIG. 4 is a block diagram of a processor 400 that may have more than one core, may have an integrated memory controller, and may have integrated graphics circuitry according to embodiments of the invention. The solid lined boxes in FIG. 4 illustrate a processor 400 with a single core 402A, a system agent 410, a set of one or more bus controller units 416, while the optional addition of the dashed lined boxes illustrates an alternative processor 400 with multiple cores 402A-N, a set of one or more integrated memory controller unit(s) in the system agent unit 410, and special purpose logic 408. The processor 400 may include a PMU or other performance monitoring circuitry having fixed counters as described herein, to maintain counts of microarchitectural events including TMA L1 events.

Thus, different implementations of the processor 400 may include: 1) a CPU with the special purpose logic 408 being integrated graphics and/or scientific (throughput) logic (which may include one or more cores), and the cores 402A-N being one or more general purpose cores (e.g., general purpose in-order cores, general purpose out-of-order cores, a combination of the two); 2) a coprocessor with the cores 402A-N being a large number of special purpose cores intended primarily for graphics and/or scientific (throughput); and 3) a coprocessor with the cores 402A-N being a large number of general purpose in-order cores. Thus, the processor 400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 400 may be a part of and/or may be implemented on one or more substrates using any of a number of process technologies, such as, for example, BiCMOS, CMOS, or NMOS.

The memory hierarchy includes one or more levels of cache units 404A-N within the cores, a set or one or more shared cache units 406, and external memory (not shown) coupled to the set of integrated memory controller units 414. The set of shared cache units 406 may include one or more mid-level caches, such as level 2 (L2), level 3 (L3), level 4

(L4), or other levels of cache, a last level cache (LLC), and/or combinations thereof. While in one embodiment a ring based interconnect unit 412 interconnects the special purpose logic 408, the set of shared cache units 406, and the system agent unit 410/integrated memory controller unit(s) 414, alternative embodiments may use any number of well-known techniques for interconnecting such units. In one embodiment, coherency is maintained between one or more cache units 406 and cores 402 A-N.

The system agent unit 410 includes those components coordinating and operating cores 402A-N. The system agent unit 410 may include for example a power control unit (PCU) and a display unit. The PCU may be or include logic and components needed for regulating the power state of the cores 402A-N and the special purpose logic 408. The display unit is for driving one or more externally connected displays.

The cores 402A-N may be homogenous or heterogeneous in terms of architecture instruction set; that is, two or more of the cores 402A-N may be capable of execution the same instruction set, while others may be capable of executing only a subset of that instruction set or a different instruction set.

Figure 5:
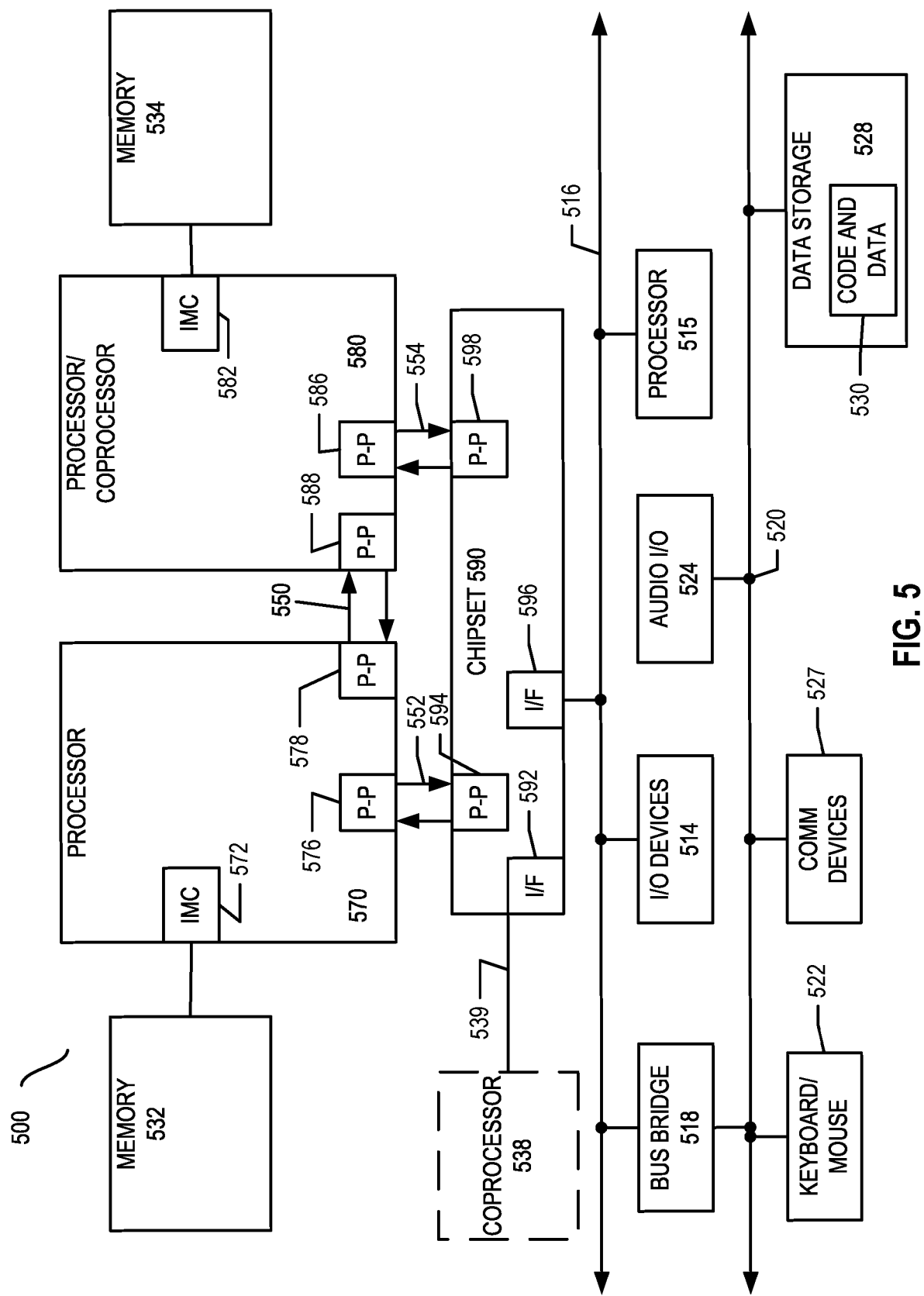
FIG. 5 is a block diagram of a first more specific exemplary system in accordance with an embodiment of the present invention.
Figure 6:
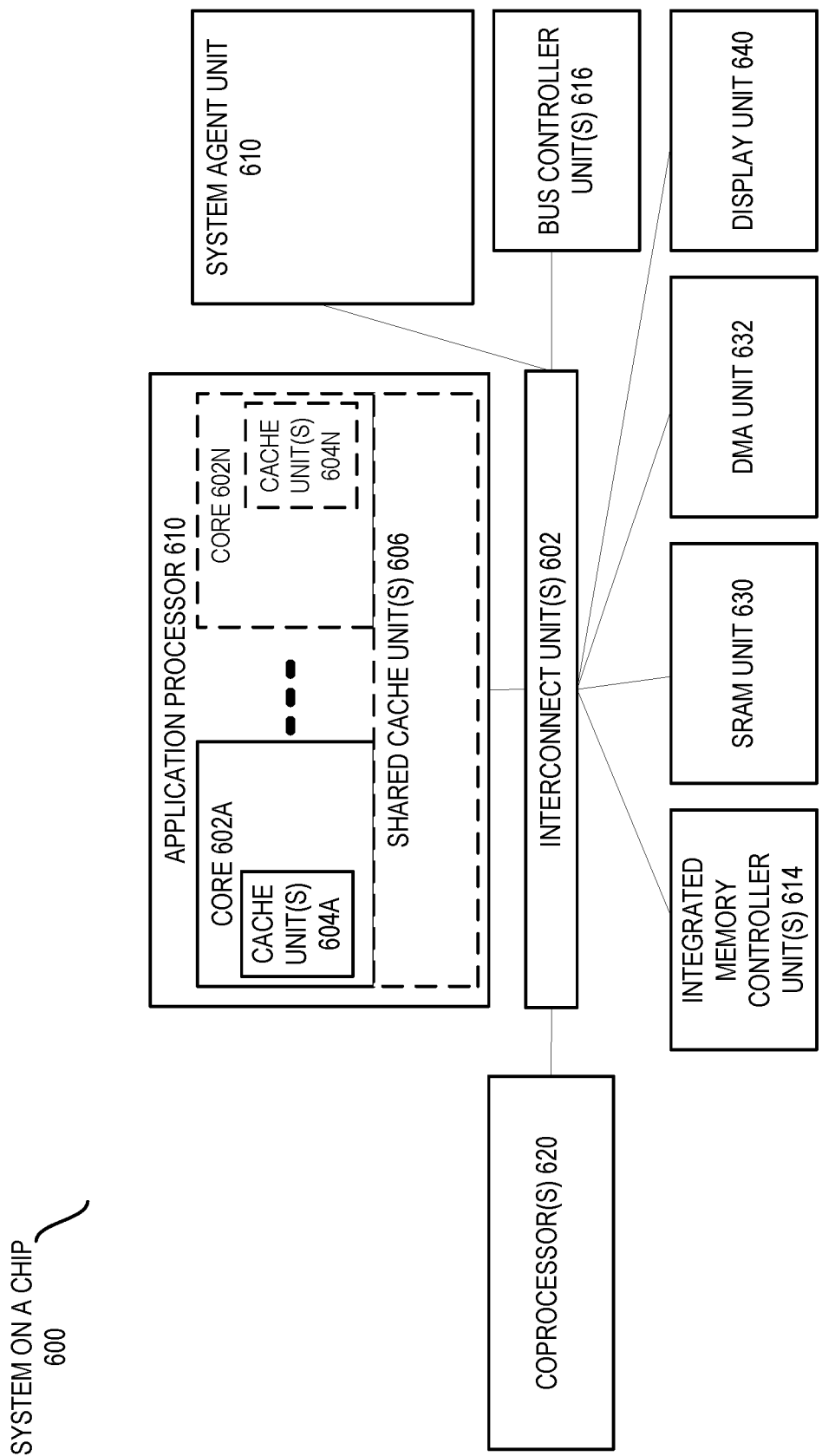
FIG. 6 is a block diagram of a SoC in accordance with an embodiment of the present invention.

FIGS. 5-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high-performance interface 539. In one embodiment, the coprocessor 538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 595. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

Referring now to FIG. 6, shown is a block diagram of a SoC 600 in accordance with an embodiment of the present invention. Dashed lined boxes are optional features on more advanced SoCs. In FIG. 6, an interconnect unit(s) 602 is coupled to: an application processor 610 which includes a set of one or more cores 602A-N (including constituent cache units 604A-N) and shared cache unit(s) 606; a system agent unit 610; a bus controller unit(s) 616; an integrated memory controller unit(s) 614; a set or one or more coprocessors 620 which may include integrated graphics logic, an image processor, an audio processor, and a video processor; a static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 630 illustrated in FIG. 6, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
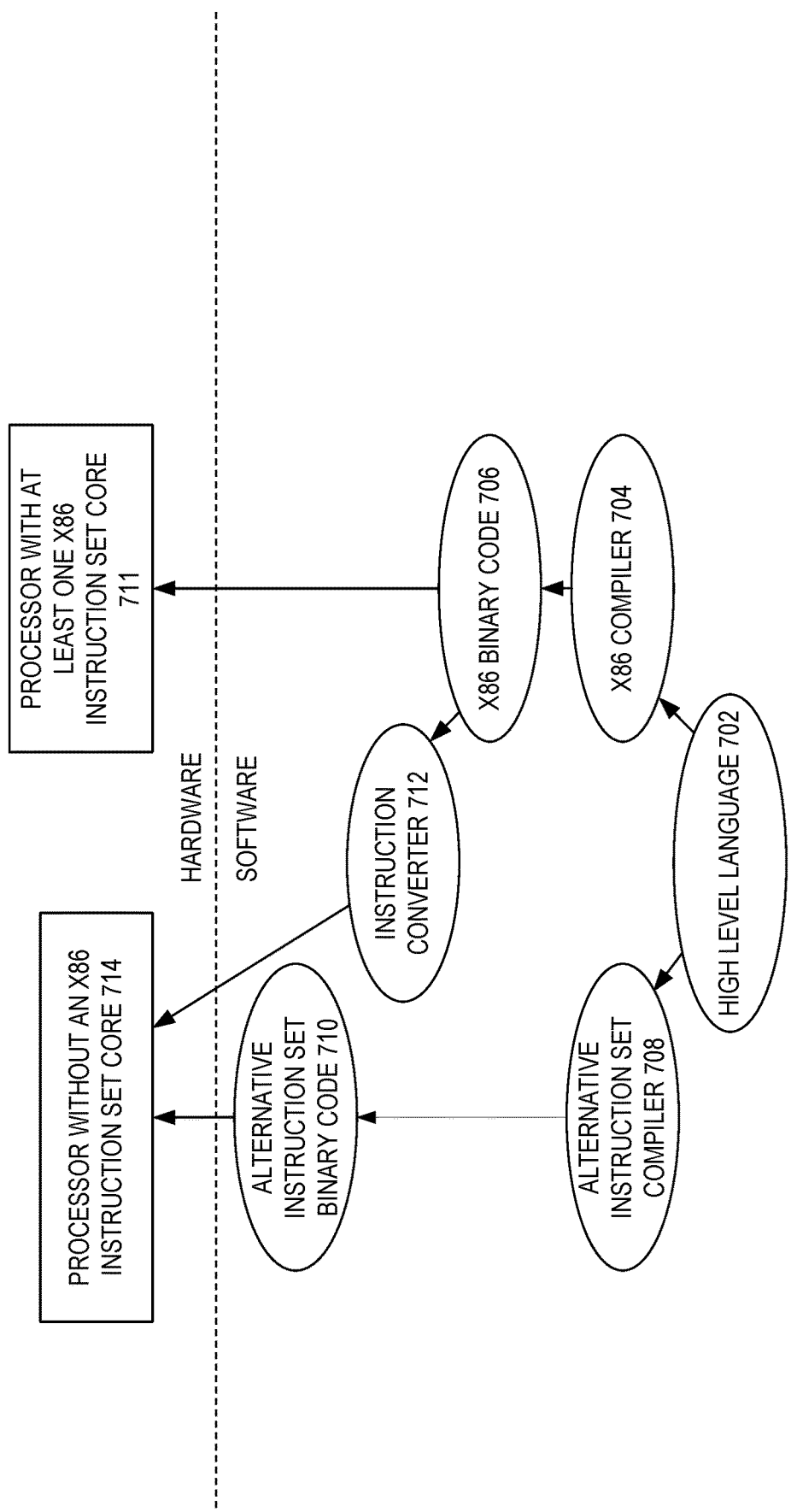
FIG. 7 is a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, CA and/or that execute the ARM instruction set of ARM Holdings of Sunnyvale, CA). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

The following examples pertain to further embodiments.

In one example, an apparatus comprises: at least one core to execute instructions; and a plurality of fixed counters coupled to the at least one core, the plurality of fixed counters to count events during execution on the at least one core, at least some of the plurality of fixed counters to count event information of a highest level of a hierarchical performance monitoring organization.

In an example, a first fixed counter of the plurality of fixed counters is configured to count first events associated with a front end bound condition.

In an example, a second fixed counter of the plurality of fixed counters is configured to count second events associated with a back end bound condition.

In an example, a third fixed counter of the plurality of fixed counters is configured to count misspeculation events.

In an example, a fourth fixed counter of the plurality of fixed counters is configured to count retirement events.

In an example, the apparatus further comprises a configuration register to store configuration information, where the configuration register comprises a first field to store a first indicator, when set, to enable the first fixed counter to count the first events.

In an example, the first fixed counter is to count a raw number of the first events.

In an example, the apparatus further comprises a computation circuit to determine a percentage of slots during which the first events occur, based at least in part on the raw number of the first events.

In an example, the apparatus further comprises a plurality of programmable counters.

In an example, the apparatus further comprises a performance monitoring unit coupled to the at least one core, wherein the performance monitoring unit comprises the plurality of fixed counters and the plurality of programmable counters.

In another example, a method comprises: enabling, via a control circuit, a first fixed counter of a performance monitor unit of a processor to maintain a count of first events, the first events of a highest hierarchical level of a performance monitoring system; updating the first fixed counter in response to occurrence of the first events during execution of a workload on the processor; and reading a value of the first fixed counter and storing the value into a storage, the value comprising a raw count of first events occurring during the execution of the workload.

In an example, the method further comprises enabling the first fixed counter to maintain the count of first events associated with a front end bound condition.

In an example, the method further comprises enabling, via the control circuit, a second fixed counter of the performance monitor unit to maintain a count of second events, the second events of the highest hierarchical level of the performance monitoring system.

In an example, the method further comprises determining a percentage of slots during which the first events occur based at least in part on the count of first events.

In an example, determining the percentage of slots comprises calculating the percentage of slots using the count of first events and a count of slots obtained from another fixed counter of the performance monitor unit.

In an example, enabling the first fixed counter comprises setting an indicator in a field of at least one configuration register, the field associated with the first fixed counter.

In an example, the method further comprises enabling the first fixed counter to maintain the count of first events for a first privilege level.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises a processor and a memory coupled to the processor. The processor may comprise: front end circuitry to fetch and decode instructions; back end circuitry to execute and retire the instructions; at least one configuration register to store configuration information; performance monitoring circuitry coupled to the front end circuitry and the back end circuitry. The performance monitoring circuitry may comprise: a plurality of fixed counters to count events of a highest level of a hierarchical performance monitoring organization; a plurality of programmable counters, where the programmable counters are programmable to count events of one or more levels of the hierarchical performance monitoring organization lower than the highest level; and a control circuit to enable one or more of the plurality of fixed counters and one or more of the plurality of programmable counters, in response to at least one write to the at least one configuration register.

In an example, the performance monitoring circuitry is to store a raw count of a first event of the highest level in the memory in response to a write instruction.

In an example, the plurality of fixed counters comprises: a first fixed counter to count events associated with a bound condition of the front end circuitry; a second fixed counter to count events associated with a bound condition of the back end circuitry; a third fixed counter to count misspeculation events; and a fourth fixed counter to count retirement events.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   at least one processor core to execute instructions; and
   a plurality of fixed counters coupled to the at least one processor core, the plurality of fixed counters to count performance monitoring events during execution of the instructions on the at least one processor core, at least some of the plurality of fixed counters to count performance monitoring events associated with a highest level of a hierarchical performance monitoring organization, the counted performance monitoring events associated with the highest level of the hierarchical performance monitoring organization being usable to monitor execution performance of a workload including the instructions.

2. The apparatus of claim 1, wherein a first fixed counter of the plurality of fixed counters is configured to count first events associated with a front end bound condition.

3. The apparatus of claim 2, wherein a second fixed counter of the plurality of fixed counters is configured to count second events associated with a back end bound condition.

4. The apparatus of claim 3, wherein a third fixed counter of the plurality of fixed counters is configured to count misspeculation events.

5. The apparatus of claim 4, wherein a fourth fixed counter of the plurality of fixed counters is configured to count retirement events.

6. The apparatus of claim 2, further comprising a configuration register to store configuration information, wherein the configuration register comprises a first field to store a first indicator, when set, to enable the first fixed counter to count the first events.

7. The apparatus of claim 2, wherein the first fixed counter is to count a raw number of the first events.

8. The apparatus of claim 7, further comprising a computation circuit to determine a percentage of slots during which the first events occur, based at least in part on the raw number of the first events.

9. The apparatus of claim 1, further comprising a plurality of programmable counters.

10. The apparatus of claim 9, further comprising a performance monitoring unit coupled to the at least one processor core, wherein the performance monitoring unit comprises the plurality of fixed counters and the plurality of programmable counters.

11. A method comprising:
executing instructions by at least one processor core; and
during execution of the instructions by the at least one processor core, counting first events of a highest hierarchical level of a performance monitoring organization by updating a first fixed counter of a plurality of fixed counters coupled to the at least one processor core, the counted first events being usable to monitor execution performance of a workload including the instructions.

12. The method of claim 11, further comprising enabling, via a control circuit, the first fixed counter to maintain the count of first events.

13. The method of claim 11, further comprising reading a value of the first fixed counter and storing the value into a storage, the value comprising a raw count of first events occurring during execution of the workload.

14. The method of claim 11, further comprising enabling the first fixed counter to maintain the count of first events associated with a front end bound condition.

15. The method of claim 12, further comprising enabling, via the control circuit, a second fixed counter to maintain a count of second events, the second events of the highest hierarchical level of the performance monitoring organization.

16. The method of claim 11, further comprising determining a percentage of slots during which the first events occur based at least in part on the count of first events, wherein determining the percentage of slots comprises calculating the percentage of slots using the count of first events and a count of slots obtained from another fixed counter of the plurality of fixed counters.

17. The method of claim 12, wherein enabling the first fixed counter comprises setting an indicator in a field of at least one configuration register, the field associated with the first fixed counter.

18. A system comprising:
a processor comprising:
at least one processor core to execute instructions, and
a plurality of fixed counters coupled to the at least one processor core, the plurality of fixed counters the plurality of fixed counters to count performance monitoring events during execution of the instructions on the at least one processor core, at least some of the plurality of fixed counters to count performance monitoring events associated with a highest level of a hierarchical performance monitoring organization, the counted performance monitoring events associated with the highest level of the hierarchical performance monitoring organization being usable to monitor execution performance of a workload including the instructions; and
a memory coupled to the processor.

19. The system of claim 18 wherein the at least one processor core comprises:
front end circuitry to fetch and decode instructions;
back end circuitry to execute and retire the instructions;
at least one configuration register to store configuration information; and
performance monitoring circuitry coupled to the front end circuitry and the back end circuitry, the performance monitoring circuitry comprising:
the plurality of fixed counters,
a plurality of programmable counters, wherein the programmable counters are programmable to count events of one or more levels of the hierarchical performance monitoring organization lower than the highest level, and
a control circuit to enable one or more of the plurality of fixed counters and one or more of the plurality of programmable counters, in response to at least one write to the at least one configuration register.

20. The system of claim 19, wherein the plurality of fixed counters comprises:
a first fixed counter to count events associated with a bound condition of the front end circuitry;
a second fixed counter to count events associated with a bound condition of the back end circuitry;
a third fixed counter to count misspeculation events; and
a fourth fixed counter to count retirement events.

* * * * *